United States Patent
Tachikawa

(10) Patent No.: US 12,030,456 B2
(45) Date of Patent: Jul. 9, 2024

(54) VEHICLE FRONT PASSENGER SEAT AIRBAG DEVICE

(71) Applicant: TOYOTA JIDOSHA KABUSHIKI KAISHA, Aichi-ken (JP)

(72) Inventor: Ken Tachikawa, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/343,743

(22) Filed: Jun. 29, 2023

(65) Prior Publication Data
US 2024/0034266 A1 Feb. 1, 2024

(30) Foreign Application Priority Data
Aug. 1, 2022 (JP) .................. 2022-122996

(51) Int. Cl.
| | | |
|---|---|---|
| *B60R 21/2346* | (2011.01) | |
| *B60R 21/205* | (2011.01) | |
| *B60R 21/233* | (2006.01) | |
| *B60R 21/2338* | (2011.01) | |

(52) U.S. Cl.
CPC ........ *B60R 21/2346* (2013.01); *B60R 21/205* (2013.01); *B60R 21/233* (2013.01); *B60R 21/2338* (2013.01)

(58) Field of Classification Search
CPC . B60R 21/2346; B60R 21/205; B60R 21/233; B60R 21/2338
See application file for complete search history.

(56) References Cited

U.S. PATENT DOCUMENTS

| | | | |
|---|---|---|---|
| 5,769,451 A | 6/1998 | Inada et al. | |
| 7,530,597 B2 * | 5/2009 | Bito ....................... | B60R 21/233 280/743.1 |
| 10,654,439 B2 * | 5/2020 | Kitagawa .............. | B60R 21/237 |
| 2001/0040368 A1 | 11/2001 | Okada et al. | |
| 2006/0006633 A1 * | 1/2006 | Bito ..................... | B60R 21/2346 280/740 |
| 2006/0049618 A1 * | 3/2006 | Bito ..................... | B60R 21/2338 280/743.1 |
| 2006/0175819 A1 * | 8/2006 | Abe ...................... | B60R 21/231 280/740 |

(Continued)

FOREIGN PATENT DOCUMENTS

| | | | | |
|---|---|---|---|---|
| DE | 4442118 A1 * | 6/1995 | .......... | B60R 21/233 |
| DE | 29817504 U1 * | 2/1999 | .......... | B60R 21/233 |

(Continued)

*Primary Examiner* — Nicole T Verley
(74) *Attorney, Agent, or Firm* — HAUPTMAN HAM, LLP

(57) ABSTRACT

A vehicle front passenger seat airbag device comprises an airbag body, a flow regulating bag, and a tether. The airbag body is housed in a vehicle rear side end portion at a front passenger seat side of an instrument panel, and is configured to be inflated and deployed toward a vehicle rear side by gas ejected from an inflator. The flow regulating bag is provided inside the airbag body and is configured to distribute the gas ejected from the inflator toward left and right sides of an interior of the airbag body. The tether is provided inside the flow regulating bag and limits an amount of projection toward the vehicle rear side at a left-right direction central portion of the flow regulating bag.

6 Claims, 12 Drawing Sheets

(56) References Cited

U.S. PATENT DOCUMENTS

| | | | |
|---|---|---|---|
| 2007/0216146 A1* | 9/2007 | Williams | B60R 21/239 |
| | | | 280/739 |
| 2008/0073892 A1* | 3/2008 | Rose | B60R 21/2338 |
| | | | 280/739 |
| 2008/0073893 A1* | 3/2008 | Schneider | B60R 21/239 |
| | | | 280/740 |
| 2009/0146404 A1* | 6/2009 | Furuno | B60R 21/2346 |
| | | | 280/732 |
| 2011/0115202 A1* | 5/2011 | Hiruta | B60R 21/239 |
| | | | 280/741 |
| 2013/0154244 A1* | 6/2013 | Miyata | B60R 21/2346 |
| | | | 280/730.1 |
| 2014/0339798 A1* | 11/2014 | Motomochi | B60R 21/205 |
| | | | 280/732 |
| 2017/0057455 A1* | 3/2017 | Lachat | B60R 21/2338 |
| 2018/0297550 A1* | 10/2018 | Kitagawa | B60R 21/231 |
| 2020/0094768 A1* | 3/2020 | Hiraiwa | B60R 21/2338 |
| 2021/0061216 A1* | 3/2021 | Ito | B60R 21/205 |

FOREIGN PATENT DOCUMENTS

| | | | | |
|---|---|---|---|---|
| DE | 29818946 U1 * | 2/1999 | | B60R 21/233 |
| DE | 19856407 A1 * | 6/1999 | | B60R 21/2171 |
| GB | 2265118 A * | 9/1993 | | B60R 21/233 |
| JP | H05-208652 A | 8/1993 | | |
| JP | 2000-159045 A | 6/2000 | | |
| JP | 2001-163152 A | 6/2001 | | |
| JP | 3399320 B2 * | 4/2003 | | B60R 21/2346 |
| JP | 2006003748 A1 * | 4/2008 | | |
| JP | 2011173473 A * | 9/2011 | | |
| JP | 2012-011870 A | 1/2012 | | |
| JP | 2012-148628 A | 8/2012 | | |
| JP | 5201090 B2 * | 6/2013 | | B60R 21/235 |
| JP | 2014051152 A * | 3/2014 | | |
| JP | 2014-166785 A | 9/2014 | | |
| JP | 2015067217 A * | 4/2015 | | B60R 21/205 |
| JP | 6143542 B2 * | 6/2017 | | |
| JP | 2019038399 A * | 3/2019 | | |
| JP | 7230748 B2 * | 3/2023 | | B60R 21/205 |
| JP | 2023042625 A * | 3/2023 | | B60R 21/205 |
| WO | WO-2009013932 A1 * | 1/2009 | | B60R 21/231 |
| WO | WO-2012096292 A1 * | 7/2012 | | B60R 21/205 |
| WO | WO-2012099155 A1 * | 7/2012 | | B60R 21/233 |
| WO | WO-2012099156 A1 * | 7/2012 | | B60R 21/203 |
| WO | WO-2013038827 A1 * | 3/2013 | | B60R 21/205 |

\* cited by examiner

VEHICLE FRONT PASSENGER SEAT AIRBAG DEVICE

CROSS-REFERENCE TO RELATED APPLICATION

This application is based on and claims priority under 35 USC 119 from Japanese Patent Application No. 2022-122996 filed on Aug. 1, 2022, the disclosure of which is incorporated by reference herein.

BACKGROUND

Technical Field

The present disclosure relates to a vehicle front passenger seat airbag device.

Related Art

Front passenger seat airbag devices that, when an airbag is being inflated and deployed, suppress the head of a dummy from being tilted forward by a front flap covering a bulge side of an airbag from an upper side to a lower side, and that suppress the dummy head from suddenly being tilted backward by a rear flap that covers the bulge side of an airbag from a lower side to an upper side, are known hitherto as in, for example, the technology disclosed in Japanese Patent Application Laid-Open (JP-A) No. 2012-148628.

However, in cases in which an instrument panel has been made thinner (a length in a height direction of the instrument panel has been reduced) such as in an electric car (BEV), this results in a layout in which the airbag device is disposed more toward the passenger. In such cases there is no room to adjust the deployment direction of flaps as described above.

Moreover, when an airbag has been deployed for example in a collision by a vehicle being rear-ended while stationery, there is a concern that a flow regulating cloth provided inside the airbag and inflating with a high internal pressure at initial deployment might forcibly press the chest of a passenger through the airbag.

Namely, while a vehicle is stationery a passenger might not always be seated with a correct posture with respect to a seat, and there is a concern that the passenger might sustain an injury from the flow regulating cloth inflating with a high internal pressure at the initial deployment were the airbag to be deployed when the chest of the passenger was in the vicinity of the instrument panel.

Particularly in cases in which the passenger is a child (for example a three year old infant), then when not seated in the correct posture with respect to the seat a contact quantity (interference quantity of overlap in the vehicle front-rear direction in a side view along the vehicle width direction), through the airbag, against the high internal pressure flow regulating cloth is large. There is accordingly a concern of excessive load being applied by the airbag (flow regulating cloth) to an adult or to a child passenger not sitting in the correct posture.

SUMMARY

The present disclosure accordingly obtains a vehicle front passenger seat airbag device capable of suppressing excessive load from being applied to a passenger.

A vehicle front passenger seat airbag device of a first aspect of the present disclosure includes an airbag body that is housed in a vehicle rear side end portion at a front passenger seat side of an instrument panel and that is configured to be inflated and deployed toward a vehicle rear side by gas ejected from an inflator, a flow regulating bag that is provided inside the airbag body and that is configured to distribute the gas ejected from the inflator toward left and right sides of an interior of the airbag body, and a tether that is provided inside the flow regulating bag and that limits an amount of projection toward the vehicle rear side at a left-right direction central portion of the flow regulating bag.

In the first aspect, the inflator is actuated when a vehicle has a collision (or rear-ending), and the airbag body is inflated and deployed while gas ejected from the inflator passes through the flow regulating bag and is distributed toward left and right sides of the interior of the airbag body. However when, for example, a three year old infant child passenger is not be seated with a correct posture with respect to a seat (front passenger seat), then there are cases in which the chest of the child passenger is at a position facing the flow regulating bag.

However, the tether is provided inside the flow regulating bag to limit the amount of projection toward the vehicle rear side at the left-right direction central portion of the flow regulating bag. The amount of projection toward the vehicle rear side at the left-right direction central portion of the flow regulating bag is accordingly reduced, and the thickness in the vehicle front-rear direction at the left-right direction central portion of the flow regulating bag is reduced. A contact quantity (interference quantity) at the child passenger against the high internal pressure flow regulating bag through the airbag body is reduced thereby. Namely, excessive load is suppressed from being applied to the passenger.

Moreover, a vehicle front passenger seat airbag device of a second aspect according to the present disclosure is the vehicle front passenger seat airbag device of the first aspect, wherein the tether is provided as a left-right pair of tethers or an up-down pair of tethers.

In the second aspect the tether is provided as the left-right pair of tethers or the up-down pair of tethers. The tethers accordingly facilitate forming the left-right direction central portion of the flow regulating bag into a substantially flat recess, and the amount of projection (thickness in the vehicle front-rear direction) toward the vehicle rear side at the left-right direction central portion can be reduced more effectively compared to cases in which there is, for example, only a single tether provided. Thus the contact quantity (interference quantity) at for example the child passenger against the high internal pressure flow regulating bag through the airbag body is reduced more effectively, and excessive load is suppressed more effectively from being applied to the passenger.

Moreover, a vehicle front passenger seat airbag device of a third aspect according to the present disclosure is the vehicle front passenger seat airbag device of the second aspect, wherein the tethers are provided such that a spacing therebetween increases on progression toward the vehicle rear side.

In the third aspect the pair of tethers are provided such that the spacing therebetween increases on progression toward the vehicle rear side. The pair of tethers accordingly enlarge the substantially flat recess zone at the left-right direction central portion of the flow regulating bag, and enable the amount of projection (thickness along a vehicle front-rear direction) toward the vehicle rear side at the left-right direction central portion of the flow regulating bag to be reduced more effectively than cases in which the tethers are provided at a constant spacing on progression toward the vehicle rear side. This reduces the contact quantity (interference quantity) more effectively at, for example, the child passenger against the high internal pressure flow regulating bag through the airbag body, and suppresses excessive load from being applied to the passenger more effectively.

Moreover, a vehicle front passenger seat airbag device of a fourth aspect according to the present disclosure is the vehicle front passenger seat airbag device of the third aspect, wherein each of the tethers is formed so as to widen on progression toward the vehicle rear side.

In the fourth aspect the pair of tethers are formed so as to widen on progression toward the vehicle rear side. The pair of tethers accordingly enlarge the substantially flat recess zone at the left-right direction central portion of the flow regulating bag, and enable the amount of projection (thickness along the vehicle front-rear direction) toward the vehicle rear side at the left-right direction central portion of the flow regulating bag to be reduced more effectively than cases in which the pair of tethers are formed at a constant width on progression toward the vehicle rear side. This reduces the contact quantity (interference quantity) more effectively at, for example, the child passenger against the high internal pressure flow regulating bag through the airbag body, and suppresses excessive load from being applied to the passenger more effectively.

A vehicle front passenger seat airbag device of a fifth aspect according to the present disclosure is the vehicle front passenger seat airbag device of the fourth aspect, wherein each of the tethers includes a vent hole to let the gas pass through.

In the fifth aspect the pair of tethers include the vent holes to let the gas pass through. Thus the pair of tethers suppress the deployment behavior of the flow regulating bag from becoming unstable when being inflated and deployed by being instantaneously being supplied with gas compared to cases in which the tethers do not include the vent holes to let gas pass through.

Moreover, the vehicle front passenger seat airbag device of a sixth aspect according to the present disclosure is the vehicle front passenger seat airbag device of any one of the first aspect to the fifth aspect, wherein, in a side view, the instrument panel is formed with a length in a vehicle height direction that is shorter than a length in a vehicle front-rear direction.

In the sixth aspect, in a side view, the instrument panel is formed with a length in the vehicle height direction that is shorter than a length in the vehicle front-rear direction. Thus although the airbag body and the flow regulating bag are disposed toward the passenger side, the amount of projection (thickness in the vehicle front-rear direction) toward the vehicle rear side at the left-right direction central portion of the flow regulating bag is reduced, and so the passenger is effectively restrained by the airbag body while suppressing excessive load from being applied to the passenger.

As described above, the present disclosure enables excessive load to be suppressed from being applied to a passenger in a vehicle front passenger seat airbag device.

BRIEF DESCRIPTION OF THE DRAWINGS

Exemplary embodiments of the present invention will be described in detail based on the following figures, wherein.

DETAILED DESCRIPTION

Figure 1:
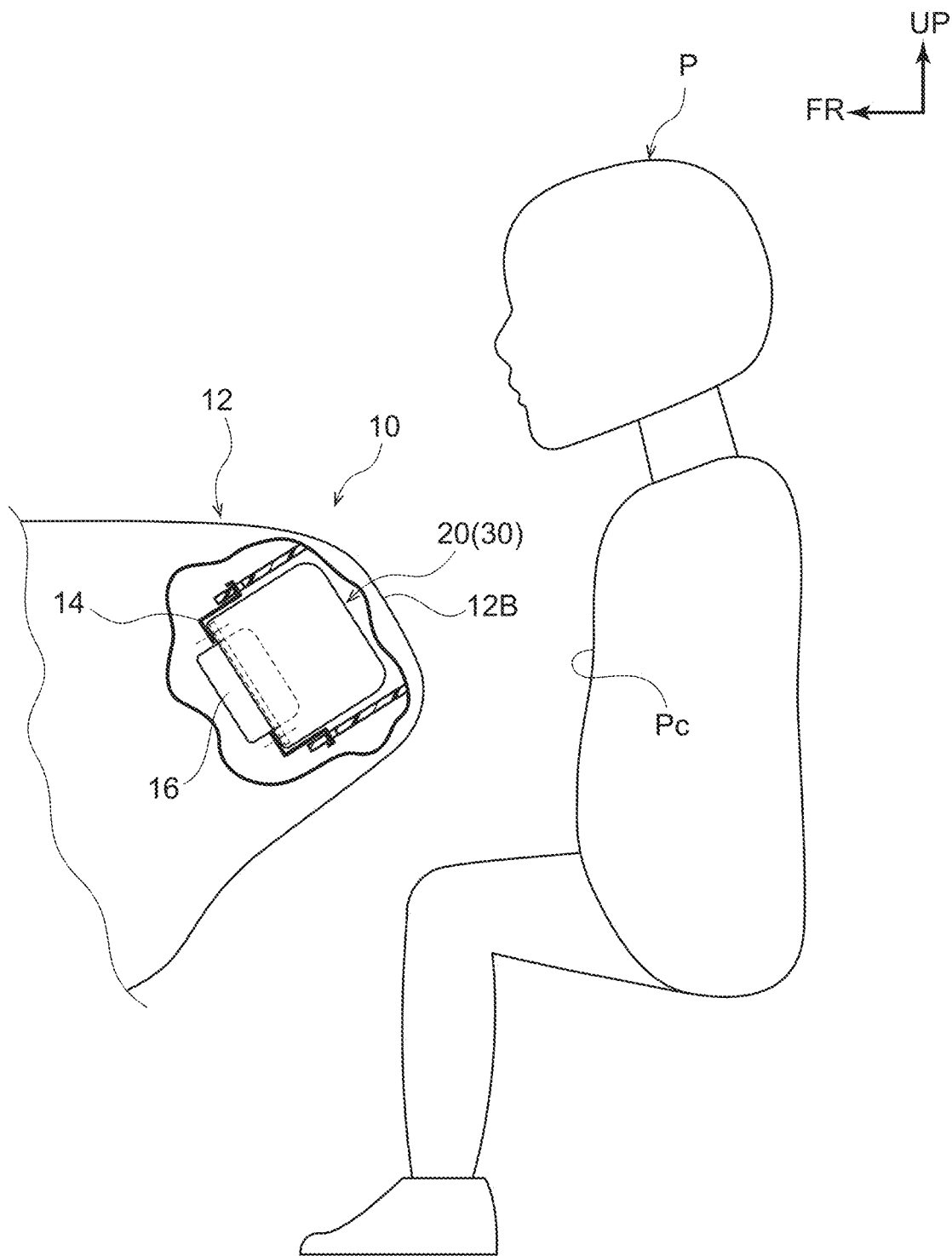
FIG. 1 is a schematic side view illustrating a vehicle front passenger seat airbag device according to an exemplary embodiment, together with a child passenger.

Detailed description follows regarding an exemplary embodiment according to the present disclosure, with reference to the drawings. Note that for ease of explanation, in the drawings an arrow UP indicates a vehicle up direction, an arrow FR indicates a vehicle front direction, and an arrow RH indicates a vehicle right direction. Thus unless specified otherwise, in the following description reference to up-down, front-rear, and left-right directions indicate vehicle up-down, front-rear, and left-right directions. The left-right direction has the same definition as vehicle width direction.

As illustrated in FIG. 1, a vehicle front passenger seat airbag device (hereafter referred to as "airbag device") 10 according to the present exemplary embodiment is, as an example, provided to a right hand drive vehicle (omitted in the drawings). Namely, the airbag device 10 is housed inside an instrument panel 12 made from resin at a left front seat side of a vehicle, i.e. the front passenger seat side.

Note that vehicles to which the airbag device 10 according to the present exemplary embodiment are applied are mainly electric cars (battery electric vehicles (BEV)). An engine compartment is shrunk in a battery electric vehicle and the cabin thereof is enlarged. This means that there is a tendency for a height direction length (height) of the instrument panel 12 to be formed shorter than a front-rear direction length in a side view along the vehicle width direction.

Namely, the instrument panel 12 tends to be thinned by reducing the height direction length (height) in a side view. Thus the airbag device 10 is housed in a rear end portion 12B of the instrument panel 12. Moreover, the rear end portion 12B of the instrument panel 12 is sometimes positioned at a front side of a chest Pc of a child passenger P (for example, a passenger equivalent to a three year old infant dummy) in cases in which the child passenger P is not seated with a correct posture with respect to a front passenger seat (seat).

The airbag device 10 is equipped with a single inflator 16 supported by a support member 14 provided inside the instrument panel 12. The inflator 16 is configured so as to instantaneously eject (supply) gas into an airbag body 20, described later, through the inside of a flow regulating bag 30, described later.

The inflator 16 is electrically connected to a detection device (omitted in the drawings) such as an acceleration sensor provided to the vehicle, and the inflator 16 is actuated by a collision (or rear-ending) of the vehicle being detected by this detection device, in a configuration such that gas is instantaneously ejected into the flow regulating bag 30 (into the airbag body 20).

Note that an opening portion 12A (see FIG. 2)) for inflating and deploying the airbag body 20 toward the rear is formed in the rear end portion 12B of the instrument panel 12, and the opening portion 12A is closed off by a door portion (omitted in the drawings) configured integrally to the instrument panel 12. The door portion is configured so as to be ruptured by the flow regulating bag 30 and the airbag body 20 as they are inflated and deployed by actuation of the inflator 16.

Figure 2:
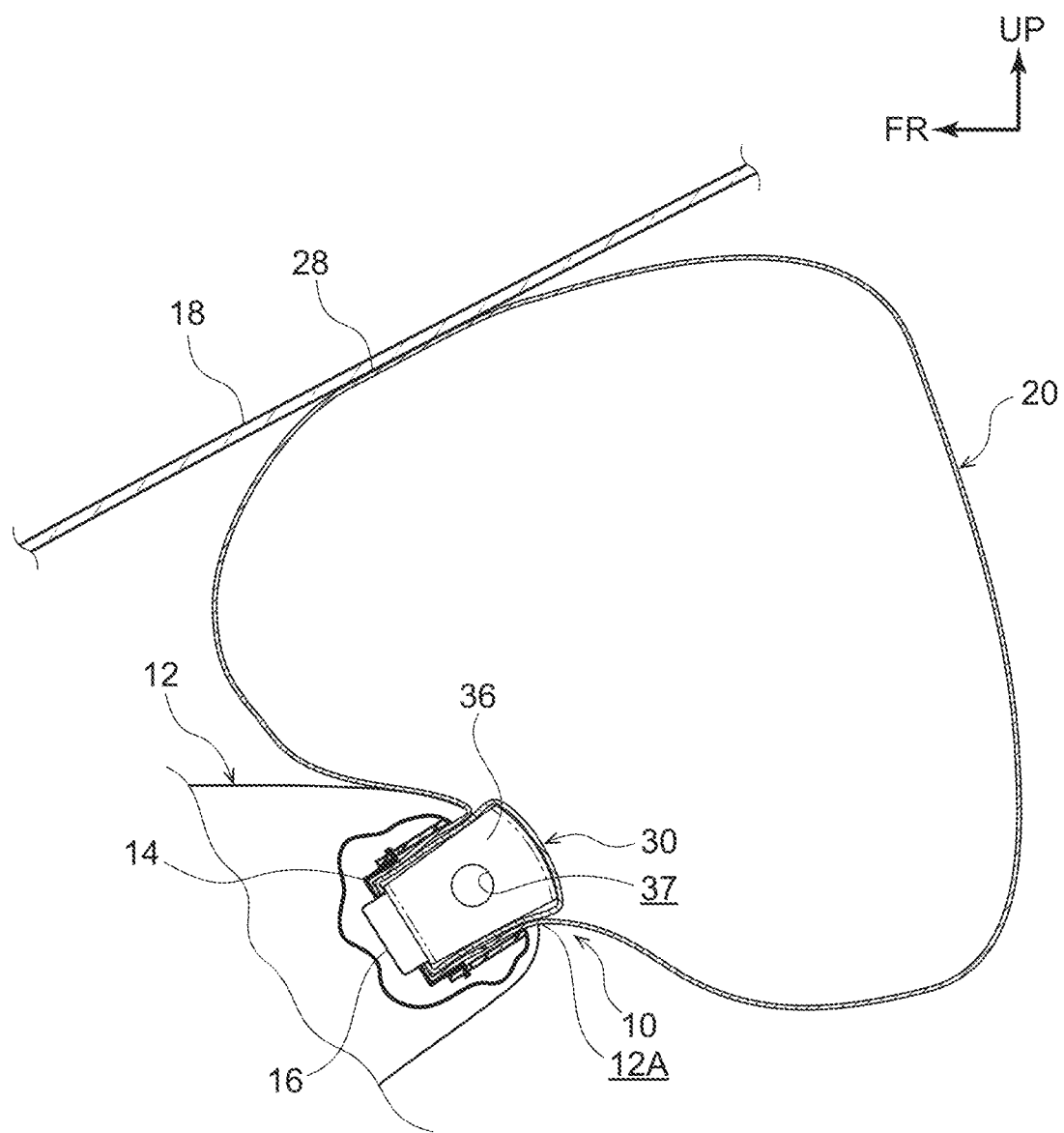
FIG. 2 is a schematic side view illustrating a state when a flow regulating bag and an airbag body of a vehicle front passenger seat airbag device according to the present exemplary embodiment have been inflated and deployed.

Moreover, as illustrated in FIG. 2, the airbag device 10 is equipped with the airbag body 20 made from cloth that is inflated and deployed toward the rear from the opening portion 12A of the instrument panel 12 by gas ejected from the inflator 16. Note that the passenger P seated in the front passenger seat is omitted in FIG. 2 in order to illustrate the shape of the airbag body 20 and the flow regulating bag 30, described later, when they have been inflated and deployed.

Figure 3:
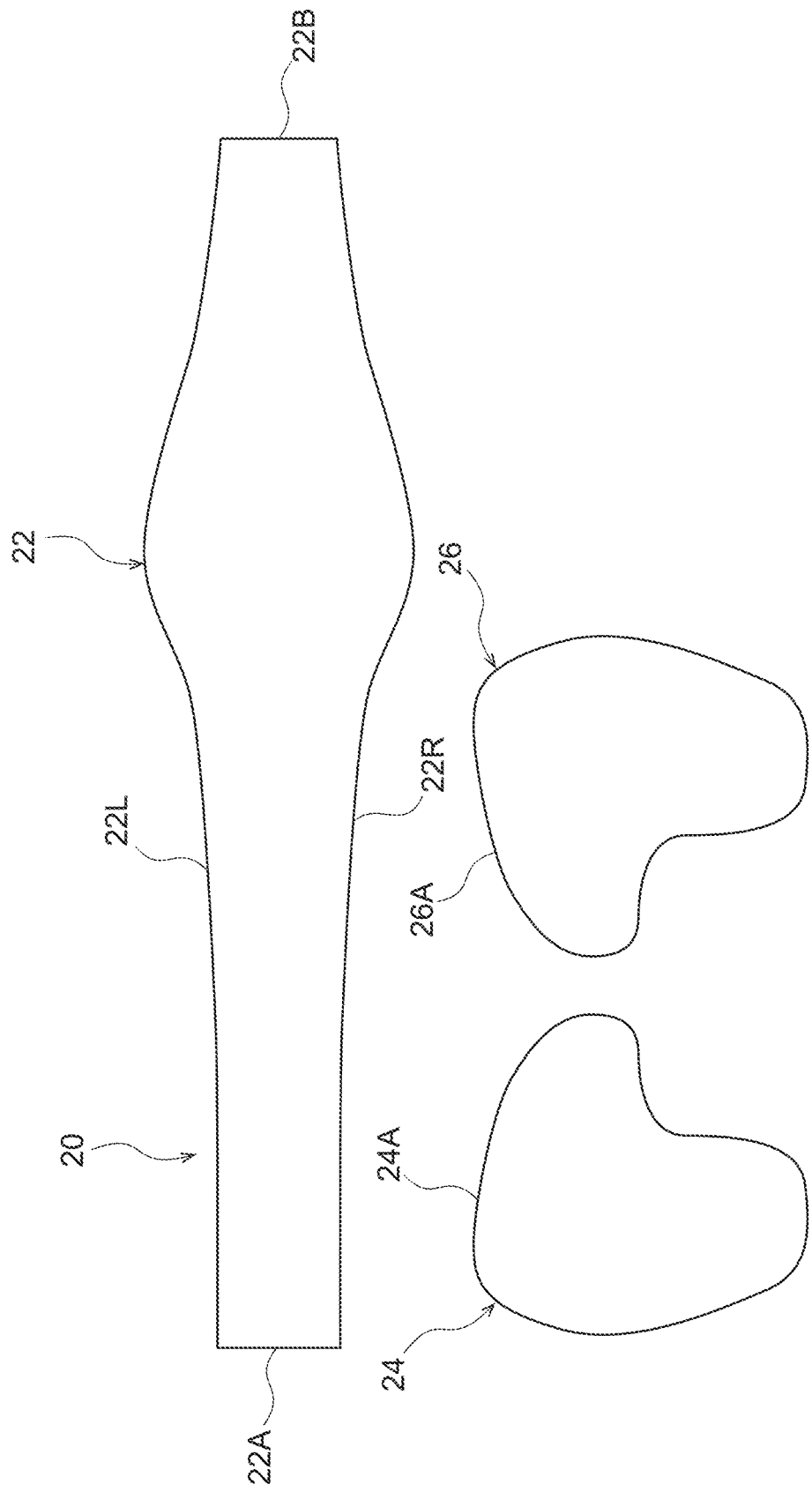
FIG. 3 is an opened out view illustrating an airbag body of a vehicle front passenger seat airbag device according to the present exemplary embodiment.

As illustrated in FIG. 3, the airbag body 20 is configured by a main panel 22 formed in a substantially tubular shape and arranged along a front-rear direction, and by a left face panel 24 and a right face panel 26 that have left-right symmetrical shapes to each other and close off both the left and right direction sides of the substantially tubular shaped main panel 22, so as to form a bag shape.

To describe in more detail, the main panel 22 has a length direction one end portion 22A and other end portion 22B configured so as to form a substantially tubular shape by each being fixed to the support member 14. A peripheral edge 24A of the left face panel 24 and a peripheral edge 26A of the right face panel 26 are then attached to a left peripheral edge 22L and a right peripheral edge 22R of the main panel 22 by being respectively sewn thereto. The airbag body 20 is thereby configured so as to be formed in a bag shape.

As illustrated in FIG. 2, part of an outer face (a face on the opposite side to the passenger restraining face) of a front wall 28 of the inflated and deployed airbag body 20 contacts an inner face of a front windshield glass 18 with a specific pressure, and is pressed relatively rearward by the front windshield glass 18 (a reaction force is obtained from the front windshield glass 18).

Note that there is a vent hole (omitted in the drawings) respectively formed in the left face panel 24 and the right face panel 26 of the airbag body 20 to discharge gas after the passenger P has been restrained. A width (a length along the left-right direction) of the airbag body 20 is set to a degree of width so as to stick out toward the left-right direction outside of both knees of an adult passenger (for example, a passenger equivalent to an adult dummy AM50: omitted in the drawings). The airbag body 20 is configured such that the airbag body 20 is housed inside the rear end portion 12B of the instrument panel 12 in a folded up state folded up in a specific fold-up direction.

Figure 6:
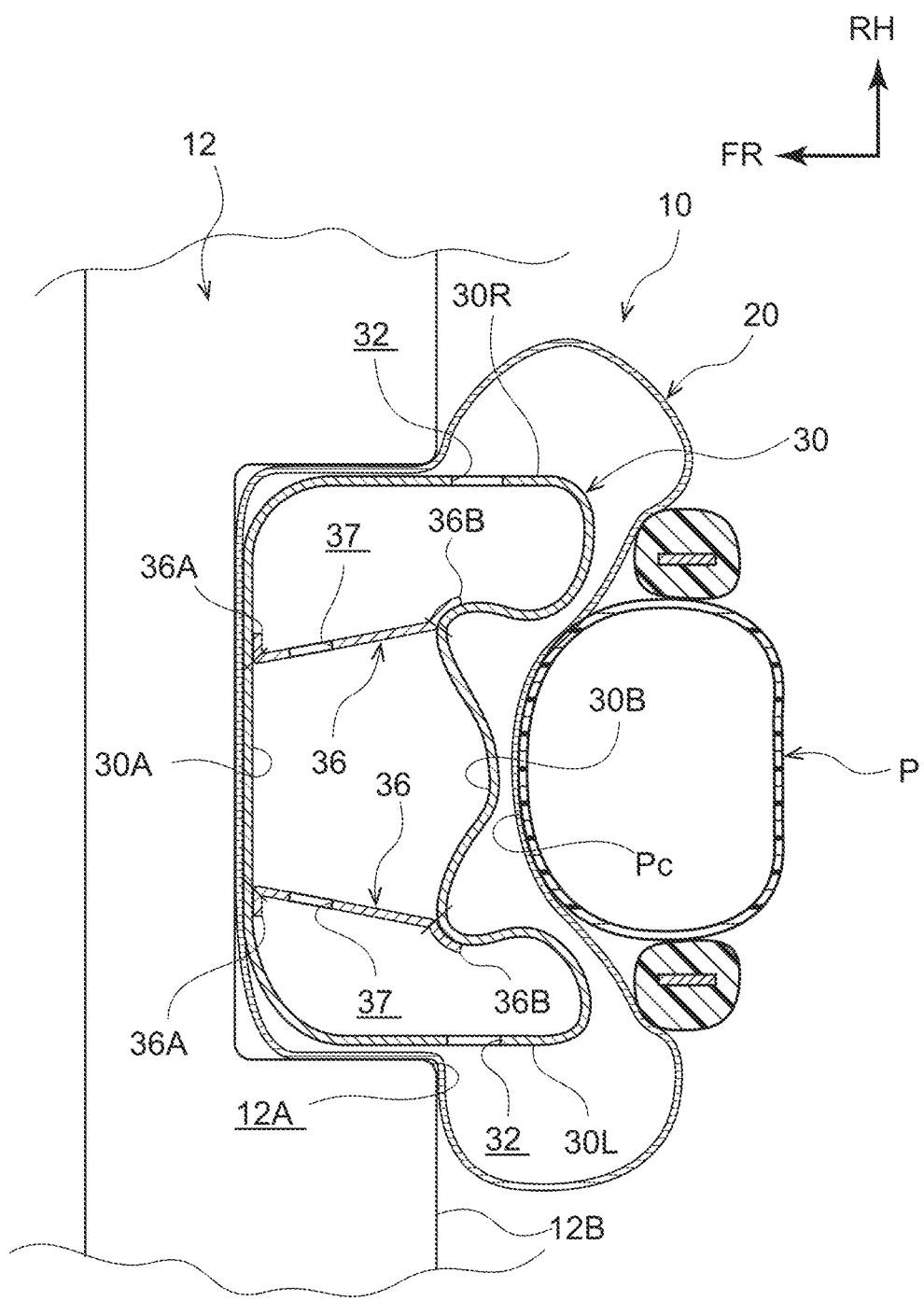
FIG. 6 is a schematic plan view cross-section illustrating a state partway through deployment of a flow regulating bag and an airbag body of a vehicle front passenger seat airbag device according to the present exemplary embodiment.

Moreover, as illustrated in FIG. 2, the airbag device 10 is equipped with the flow regulating bag 30 made from cloth (made from a cloth material similar to that of the airbag body 20) at the instrument panel 12 side of the interior of the airbag body 20. As illustrated in FIG. 6, the flow regulating bag 30 is provided so as to, while being inflated and deployed by gas ejected from the inflator 16, eject gas from left and right direction walls of the flow regulating bag 30, namely from opening portions 32 formed in a left side wall 30L and a right side wall 30R thereof.

Figure 5:
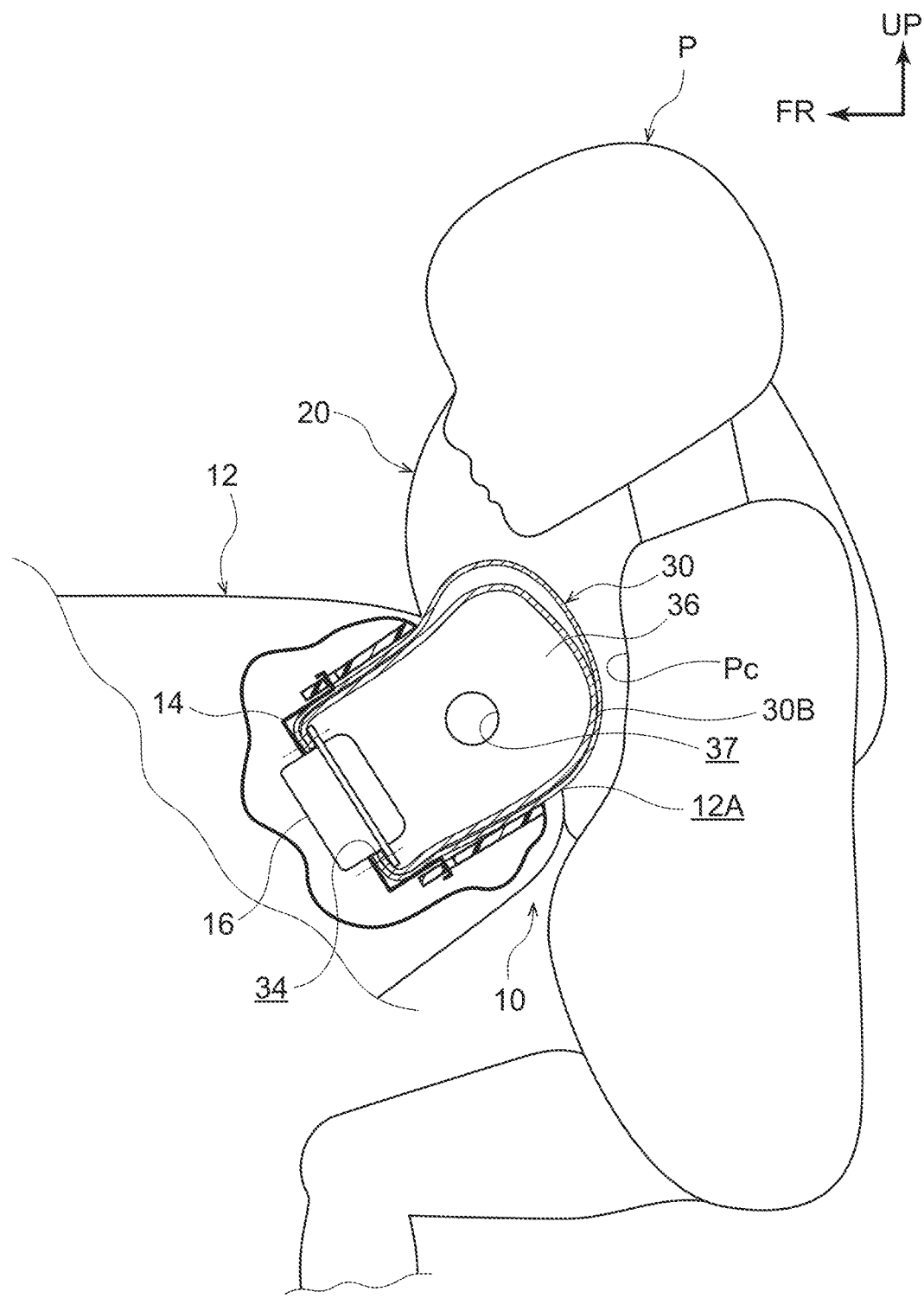
FIG. 5 is schematic side view illustrating a state partway through deployment of a flow regulating bag and an airbag body of a vehicle front passenger seat airbag device according to the present exemplary embodiment.

The flow regulating bag 30 includes an inlet port 34 for introducing gas ejected from the inflator 16 into a left-right direction central portion of a front end portion thereof, see FIG. 5). Namely, in the flow regulating bag 30 the inlet port 34 is connected to an ejection port (omitted in the drawings) of the inflator 16, and a periphery of the inlet port 34 is also fixed to the one end portion 22A and the other portion 22B of the main panel 22 as well as to the support member 14.

The flow regulating bag 30 thereby has a configuration in which gas introduced from the inlet port 34 (ejected into the inlet port 34) is distributed toward both the left and right direction sides of the interior of the airbag body 20. Moreover, the flow regulating bag 30 is also housed inside the rear end portion 12B of the instrument panel 12 in a folded up state folded in a specific fold-up direction together with the airbag body 20.

Moreover, as illustrated in FIG. 6, a configuration is adopted such that when the flow regulating bag 30 is inflated and deployed by gas being ejected, the rearward amount of projection at the left-right direction central portion thereof is limited by a left-right pair of tethers 36 so as to be smaller than a rearward amount of projection at the left-right direction end portions thereof.

In other words, a configuration is adopted such that when the flow regulating bag 30 has been inflated and deployed by gas being ejected, a thickness along a substantially front-rear direction at the left-right direction central portion is reduced by the left-right pair of tethers 36, and in plan view, the left-right direction central portion is formed with a substantially flat recess shape, namely a substantially shallow square sided C shape in plan view.

Figure 4:
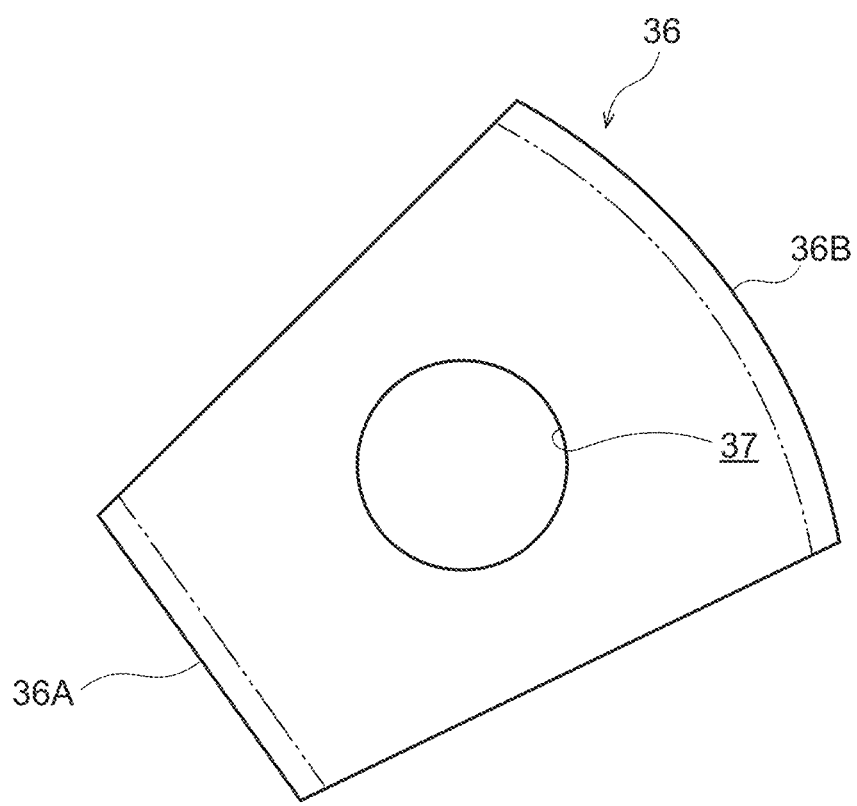
FIG. 4 is schematic side view illustrating a tether inside a flow regulating bag of a vehicle front passenger seat airbag device according to the present exemplary embodiment.

As illustrated in FIG. 2, FIG. 4, and FIG. 5, the left-right pair of tethers 36 are tethers made from cloth having a specific thickness (made from a cloth material similar to that of the airbag body 20), and are formed in the same shape and size as each other. Namely, in a side view, the tethers 36 are each formed in a substantially fan shape that widens on progression rearward while extending along the substantially front-rear direction. The zone at the left-right direction central portion of the flow regulating bag 30 where the thickness is reduced is thereby configured so as to be enlarged in the height direction on progression toward the rear.

Note that, as illustrated in FIG. 6, a front end portion 36A of each of the tethers 36 is attached by sewing to a portion of a front wall 30A of the flow regulating bag 30, and a rear end portion 36B of each of the tethers 36 is attached by sewing to a portion of a rear wall 30B of the flow regulating bag 30. Moreover, although omitted in the drawings, the front end portion 36A of each of the tethers 36 may be attached by sewing to a portion of the front wall 30A of the flow regulating bag 30 and to portions of a front end section of the airbag body 20 (a one end portion 22A and other end portion 22B of the main panel 22).

Moreover, there is a circular shaped vent hole 37 formed with a specific internal diameter at a substantially central portion of each of the tethers 36 to let the gas pass through. Thus gas introduced through the inlet port 34 (ejected into the inlet port 34) passes through the vent hole 37 of the tethers 36 and is supplied toward the left and right direction sides of the flow regulating bag 30, and moreover passes through the opening portions 32 formed in the left side wall 30L and the right side wall 30R of the flow regulating bag 30 so as to be supplied toward the left and right sides of the airbag body 20.

Moreover, as illustrated in FIG. 6, the tethers 36 are provided so that a spacing therebetween increases on progression rearward. A configuration is accordingly adopted in which the zone at the left-right direction central portion of the flow regulating bag 30 where the thickness is reduced is enlarged in the left-right direction on progression rearward.

Note that the zone where the thickness at the left-right direction central portion of the flow regulating bag 30 is reduced is configured so as to face the chest Pc of the child passenger P in the front-rear direction as described above. A left-right direction length of this zone (the spacing between the rear end portions 36B of the tethers 36) is set so as to be at least a left-right direction length of the chest Pc of the child passenger P (three year old infant dummy), and the height direction length thereof (length of the rear end portions 36B of the tethers 36) is set so as to be at least a height direction length of the chest Pc.

Description follows regarding the operation of the airbag device 10 according to the present exemplary embodiment configured as described above.

The inflator 16 is actuated when the detection device has detected that the vehicle has had a collision (or been rear-ended), and gas is instantaneously ejected (supplied) into the airbag body 20 through the interior of the flow regulating bag 30. Namely, the airbag body is inflated and deployed toward the rear side (the side of the passenger P). To describe in more detail, the gas ejected from the inflator 16 is first ejected (supplied) into the flow regulating bag 30.

The gas that has been ejected (supplied) into the flow regulating bag 30 passes through the vent holes 37 of the left-right pair of tethers 36 provided inside the flow regulating bag 30, and is supplied toward the left and right sides of the flow regulating bag 30. Furthermore, the gas supplied toward the left and right sides of the flow regulating bag 30 is ejected from the opening portions 32 formed in the left side wall 30L and the right side wall of the flow regulating bag 30 (is distributed toward the left and right sides), and is supplied into the airbag body 20.

This means that by providing the flow regulating bag 30 inside the airbag body 20, the behavior of the airbag body 20 can be suppressed from becoming unstable due to the high pressure of the instantaneously ejected gas compared to configurations in which the flow regulating bag 30 is not provided inside the airbag body 20.

Moreover, as illustrated in FIG. 2, part of the outer face of the front wall 28 of the airbag body 20 contacts the inner face of the front windshield glass 18 at a specific pressure, and is pressed relatively rearward by the front windshield glass 18 (a reaction force is obtained from the front windshield glass 18).

Thus, for example, even though the airbag body 20 has been made more bulky as the instrument panel 12 has been thinned, the deployment behavior of the airbag body 20 can be suppressed more effectively from becoming unstable when instantaneously supplied with gas and inflated and deployed (the deployment behavior can be more effectively stabilized). This thereby enables the passenger P seated in the front passenger seat to be appropriately restrained.

The left-right pair of tethers 36 are provided inside the flow regulating bag 30 to limit the rearward amount of projection at the left-right direction central portion of the flow regulating bag 30. Thus as illustrated in FIG. 5 and FIG. 6, for example for a child passenger P equivalent to a three year old infant dummy, even when the chest Pc thereof is positioned facing the rear end portion 12B of the instrument panel 12 in the front-rear direction, the rear wall 30B of the inflated and deployed flow regulating bag 30 does not press the chest Pc through the airbag body 20.

Figure 9:
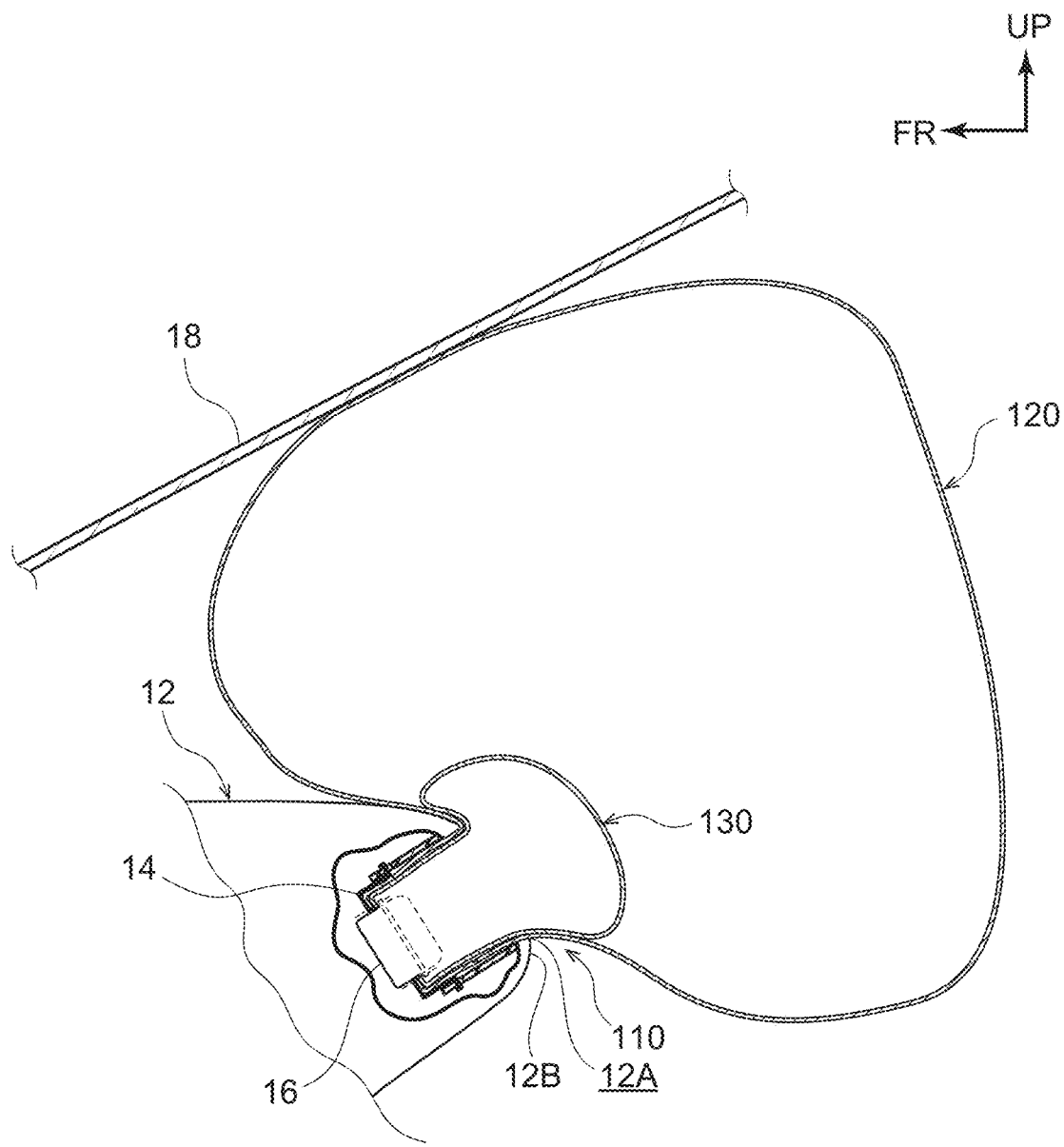
FIG. 9 is schematic side view illustrating a state when a flow regulating bag and an airbag body of a vehicle front passenger seat airbag device according to a comparative example have been inflated and deployed.

Description follows regarding an airbag device 110 according to a comparative example. As illustrated in FIG. 9, in a flow regulating bag 130 of the airbag device 110 there are only openings 132 respectively formed in a left side wall 130L and a right side wall 130R of the flow regulating bag 130 for ejecting gas therefrom, however a left-right pair of tethers are not provided inside.

Figure 10A:
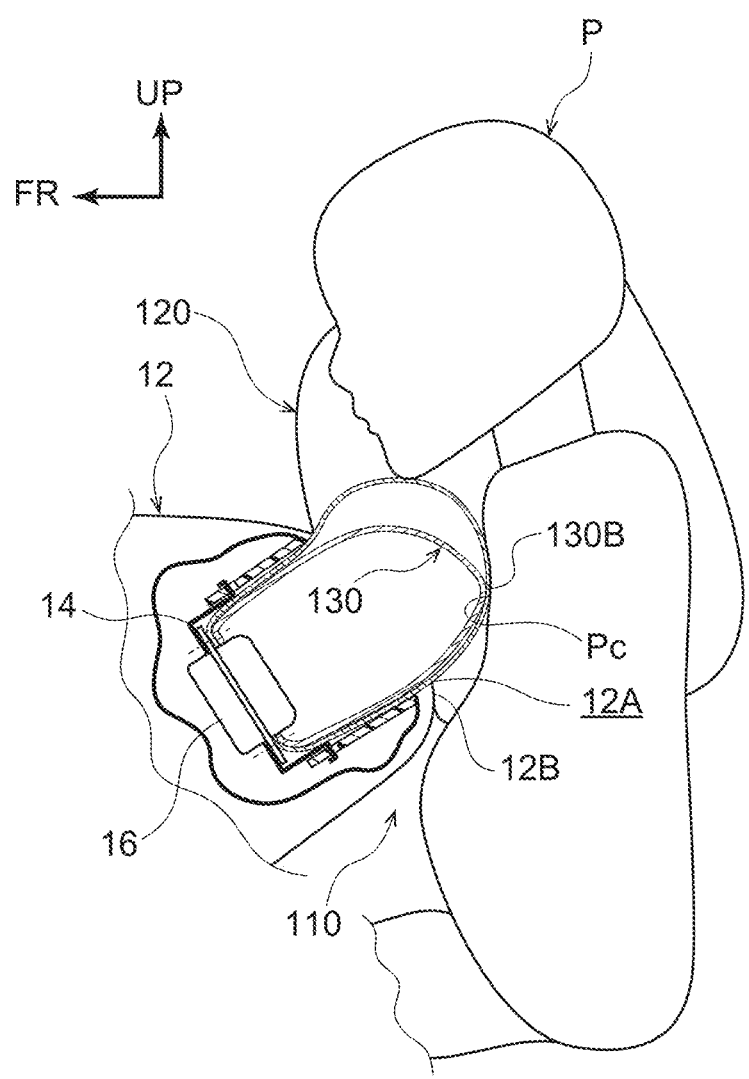
FIG. 10A is a schematic side view illustrating a state partway through deployment of a flow regulating bag and an airbag body of a vehicle front passenger seat airbag device according to a comparative example.
Figure 10B:
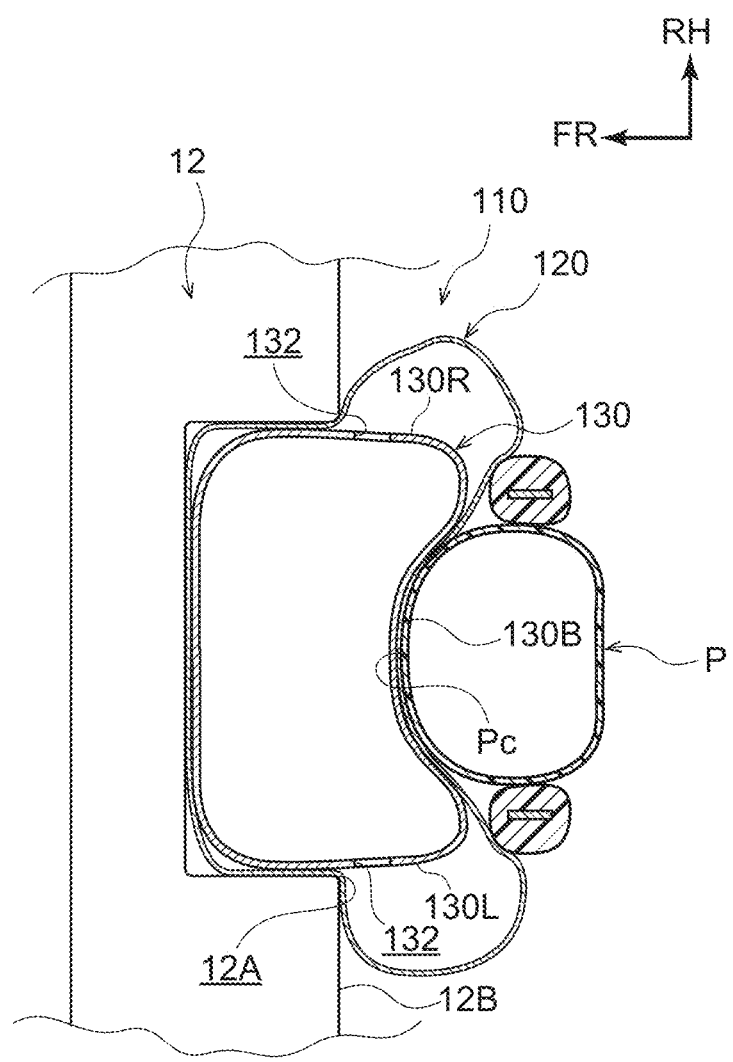
FIG. 10B is a schematic cross-section plan view illustrating a state partway through deployment of a flow regulating bag and an airbag body of a vehicle front passenger seat airbag device according to a comparative example.

Thus, as illustrated in FIG. 10A and FIG. 10B, for a child passenger P equivalent to a three year old infant dummy, when the chest Pc thereof is present at a position facing the rear end portion 12B of the instrument panel 12 in the front-rear direction, a rear wall 130B of the inflated and deployed flow regulating bag 130 presses the chest Pc through the airbag body 120.

In contrast thereto, in the airbag device 10 according to the present exemplary embodiment, as illustrated in FIG. 6, the left-right pair of tethers 36 is provided inside the flow regulating bag 30. This means that when the flow regulating bag 30 is inflated and deployed, a rearward amount of projection can be reduced at the left-right direction central portion, enabling a thickness at the left-right direction central portion along the substantially front-rear direction can be reduced.

Figure 7:
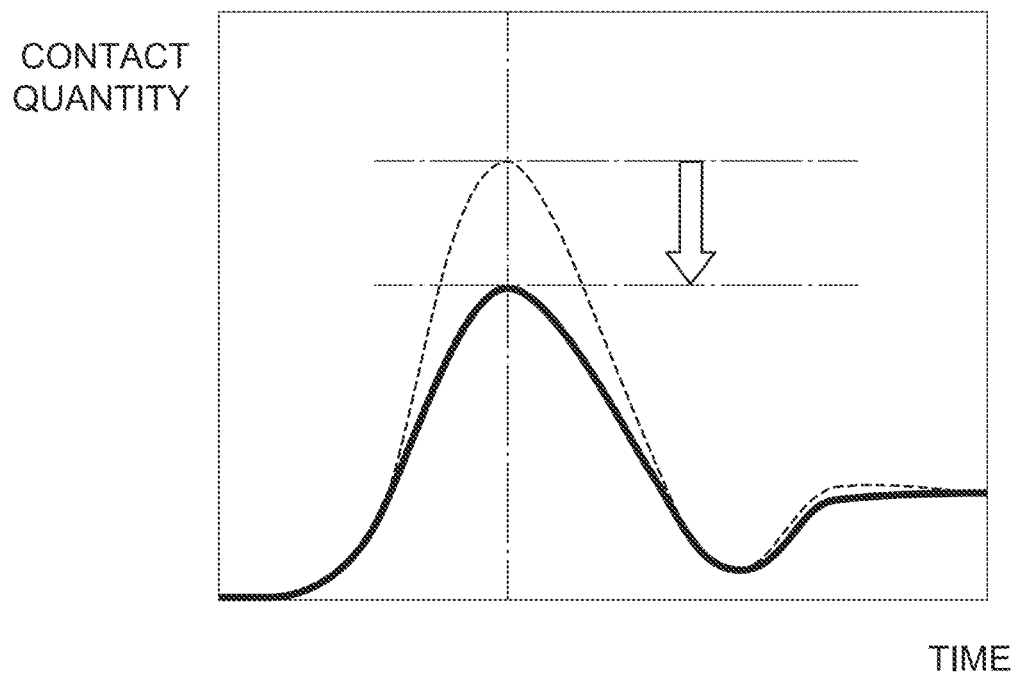
FIG. 7 is a graph illustrating a contact quantity to a passenger of a flow regulating bag through an airbag body against elapsed time after inflator actuation of a vehicle front passenger seat airbag device according to the present exemplary embodiment, together with a comparative example thereof.

Thus, as illustrated in FIG. 7, for the child passenger P a contact quantity (interference quantity of overlap in the front-rear direction in a side view: indicated by a solid line) against the high internal pressure flow regulating bag 30 through the airbag body 20 arising from actuation of the inflator 16 can be reduced in comparison to the case of the airbag device 110 according to the comparative example (indicated by a broken line).

Namely, the airbag device 10 according to the present exemplary embodiment enables an excessively high load to be suppressed from being applied to the child passenger P. This thereby enables an injury severity score to the chest Pc, and furthermore to the neck, of the child passenger P to be reduced.

There is a left-right pair of the tethers 36 provided. The tethers 36 accordingly facilitate forming the left-right direction central portion of the flow regulating bag 30 into the substantially flat recess shape, and the amount of projection (thickness in the substantially front-rear direction) toward the rear at the left-right direction central portion can be reduced more effectively compared to cases in which there is, for example, only a single tether provided.

The tethers 36 are moreover formed so as to widen on progression toward the rear. This thereby enables the substantially flat recess zone at the left-right direction central portion of the flow regulating bag 30 to be enlarged in the height direction, and enables the amount of projection (thickness in the substantially front-rear direction) toward the rear at the left-right direction central portion of the flow regulating bag 30 to be reduced more effectively, than cases in which the tethers 36 are formed at a constant width on progression toward the rear.

Furthermore, the tethers 36 are provided such that the spacing therebetween increases on progression rearward. This thereby enables the substantially flat recess zone at the left-right direction central portion of the flow regulating bag 30 to accordingly be enlarged in the left-right direction, and enables the amount of projection (thickness in the substantially front-rear direction) toward the rear at the left-right direction central portion of the flow regulating bag 30 to be reduced more effectively, than cases in which the tethers 36 are provided at a constant spacing therebetween on progression toward the rear.

Thus the configuration described above enables the contact quantity (interference amount) for the child passenger P against the high internal pressure flow regulating bag 30 through the airbag body 20 to be reduced more effectively, and enables excessive load to be suppressed more effectively from being applied to the child passenger P.

Moreover, the left-right direction length of the zone where the thickness (the spacing between the rear end portions 36B of the tethers 36) is reduced at the left-right direction central portion of the flow regulating bag 30 is set to at least a left-right direction length of the chest Pc of the child passenger P (three year old infant dummy), and the length thereof in the height direction (the length of the rear end portions 36B of the tethers 36) is set to at least a height direction length of the chest Pc.

This thereby enables the contact quantity (interference amount) at the child passenger P against the high internal pressure flow regulating bag 30 through the airbag body 20 to be reduced more effectively, and enables excessive load to be suppressed more effectively from being applied to the child passenger P, than in cases in which left-right direction length of this zone is less than the left-right direction length at the chest Pc of the child passenger P and the height direction length of this zone is less than the height direction length at the chest Pc.

The tethers 36 each include the vent hole 37 to let gas pass through. The tethers 36 are accordingly able to suppress the deployment behavior of the flow regulating bag 30 from becoming unstable when being inflated and deployed by being instantaneously supplied with gas compared to cases in which the tethers 36 lack the vent holes 37 to let gas pass through.

In plan view, the left-right direction central portion of the flow regulating bag 30 is recessed in the substantially flat shape by the left-right pair of tethers 36 that limit the thickness in the substantially front-rear direction. Thus the flow regulating bag 30 can be more easily formed in the shape of a substantially flat recess than configurations in which the left-right direction central portion is formed in a substantially flat recess by a method other than using the left-right pair of tethers 36 (or the up-down pair of tethers 38 described later).

Moreover, the instrument panel 12 has a height direction length formed shorter than a front-rear direction length in a side view. This means that although the airbag body 20 and the flow regulating bag 30 are disposed toward the side of the passenger P, the rearward amount of projection at the left-right direction central portion of the flow regulating bag 30 (the thickness in the substantially front-rear direction) is reduced, and so the passenger P can be effectively restrained by the airbag body 20 while suppressing excessive load from being applied to the passenger P.

Modified Example

Figure 8A:
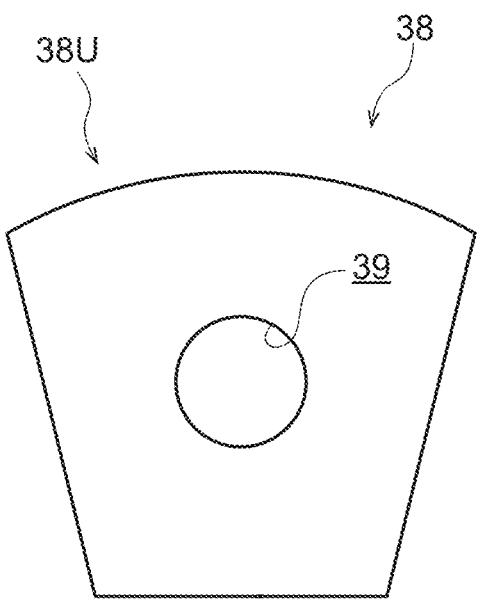
FIG. 8A is a schematic plan view illustrating a tether inside a flow regulating bag of a vehicle front passenger seat airbag device according to a modified example of the present exemplary embodiment.
Figure 8B:
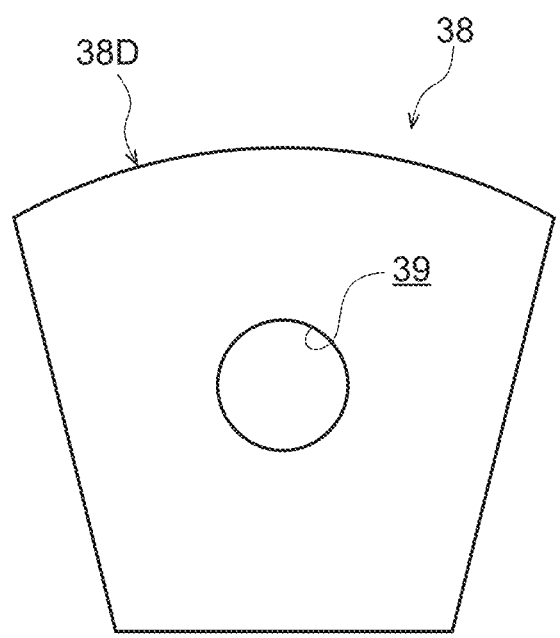
FIG. 8B is a schematic plan view illustrating a tether inside a flow regulating bag of a vehicle front passenger seat airbag device according to a modified example of the present exemplary embodiment.

Note that the tethers provided inside the flow regulating bag 30 are not limited to the left-right pair of tethers 36. The tethers provided inside the flow regulating bag 30 may be an up-down pair of tethers 38, as illustrated in FIG. 8A and FIG. 8B. For the up-down pair of tethers 38 configuration, a lower tether 38D as illustrated in FIG. 8B is formed in a substantially fan shape one size larger than an upper tether 38U illustrated in FIG. 8A, and the tethers 38 are provided such that a spacing therebetween increases on progression toward the rear, similarly to the left-right pair of tethers 36.

The rearward amount of projection at the left-right direction central portion can also be reduced when the flow regulating bag 30 is inflated and deployed for the up-down pair of tethers 38 configuration too, enabling the thickness thereof in the substantially front-rear direction to be reduced. This thereby enables the contact quantity (interference quantity of overlap in the front-rear direction in a side view) at the child passenger P against the high internal pressure flow regulating bag 30 through the airbag body 20 to be reduced.

Moreover, the tethers 38 are formed so as to widen on progression toward the rear. Thus the tethers 38 enable the substantially flat recess zone at the left-right direction central portion of the flow regulating bag 30 to be enlarged in the left-right direction, and enable the rearward amount of projection (thickness along the substantially front-rear direction) at the left-right direction central portion of the flow regulating bag 30 to be reduced more effectively, than cases in which the tethers 38 are formed at a constant width on progression toward the rear.

Furthermore, the tethers 38 are provided so that a spacing therebetween increases on progression toward the rear. Thus the tethers 38 enable the substantially flat recess zone at the left-right direction central portion of the flow regulating bag 30 to be enlarged in the up-down direction, and enable the rearward amount of projection (thickness along the substantially front-rear direction) at the left-right direction central portion of the flow regulating bag 30 to be reduced more effectively, than cases in which the tethers 38 are provided at a constant spacing on progression toward the rear.

Note that left and right sides are open in the configuration with the up-down pair of tethers 38. The gas introduced through the inlet port 34 (ejected into the inlet port 34) is accordingly supplied quickly toward the left and right sides of the flow regulating bag 30, and so vent holes may be omitted from being formed at substantially central portions of the upper tether 38U and the lower tether 38D.

However, as illustrated in the drawings, circular shaped vent holes 39 having a specific inner diameter may be respectively formed in substantially central portions of the upper tether 38U and the lower tether 38D. Adopting such an approach enables gas to be more quickly supplied to inside the flow regulating bag 30 than cases lacking the vent holes 39 formed in the substantially central portions of the upper tether 38U and the lower tether 38D for ejecting gas also upward and downward from the up-down pair of tethers 38.

In the configuration with the up-down pair of tethers 38 there is a need to have different upper and lower sizes according to a layout position of the airbag device 10 and according to an inclination angle as viewed along the vehicle width direction. However, the size of the tethers can be exactly the same on the left and right in the configuration with left-right pair of tethers 36 as described above. This means that configuration with the left-right pair of tethers 36 has an advantage over the configuration with the up-down pair of tethers 38 in that a manufacturing cost of the tethers themselves can be reduced, and productivity can also be raised.

The vehicle front passenger seat airbag device 10 according to the present exemplary embodiment has been described with reference to the drawings, however the vehicle front passenger seat airbag device 10 according to the present exemplary embodiment is not limited by the drawings, and appropriate design modifications are possible thereto within a range not departing from the spirit of the present disclosure. For example, the inflator 16 may be configured so as to be actuated not only when a collision (or rear-ending) of the vehicle has been detected, but also when a collision (or rear-ending) of the vehicle is predicted by a collision prediction sensor or the like.

Moreover, the passenger is not limited to being the child passenger P described above, and may be an adult passenger as described above. For example, the adult passenger might conceivably not be seated in a correct posture with respect to the front passenger seat while the vehicle is stationery. More specifically, the adult passenger might conceivably have removed their seatbelt and be lying down or the like in a state in which the chest of the passenger is in the vicinity of the instrument panel 12. Were the airbag body 20 to be deployed in such a state, due to a rear-ending or the like, then there would be a concern that the passenger might sustain an injury from the high internal pressure flow regulating bag 30 inflating at initial deployment.

However, the present exemplary embodiment is, as described above, configured such that the thickness along the substantially front-rear direction at the left-right direction central portion of the flow regulating bag 30 is reduced by the left-right pair of tethers 36 or by the up-down pair of tethers 38. This means that excessive load can be suppressed from being applied even, for example, to an adult passenger lying down in a state in which the chest of the passenger is in the vicinity of the instrument panel 12 (not seated in a correct posture).

What is claimed is:

1. A vehicle front passenger seat airbag device comprising:
   an airbag body that is housed in a vehicle rear side end portion at a front passenger seat side of an instrument panel, and that is configured to be inflated and deployed toward a vehicle rear side by gas ejected from an inflator;
   a flow regulating bag that is provided inside the airbag body and that is configured to distribute the gas ejected from the inflator toward left and right sides of an interior of the airbag body; and
   a tether that is provided inside the flow regulating bag and that limits an amount of projection toward the vehicle rear side at a left-right direction central portion of the flow regulating bag.

2. The vehicle front passenger seat airbag device of claim 1, wherein the tether is provided as a left-right pair of tethers or an up-down pair of tethers.

3. The vehicle front passenger seat airbag device of claim 2, wherein the pair of tethers are provided such that a spacing therebetween increases on progression toward the vehicle rear side.

4. The vehicle front passenger seat airbag device of claim 3, wherein each of the tethers is formed so as to widen on progression toward the vehicle rear side.

5. The vehicle front passenger seat airbag device of claim 4, wherein each of the tethers includes a vent hole to let the gas pass through.

6. The vehicle front passenger seat airbag device of claim 1, wherein, in a side view, the instrument panel is formed with a length in a vehicle height direction that is shorter than a length in a vehicle front-rear direction.

* * * * *